United States Patent
Cromeens (10) Patent No.: US 10,286,604 B2
(45) Date of Patent: May 14, 2019

(54) METHOD, SYSTEM, AND APPARATUS FOR BIOLOGICAL MODEL SYMMETRY

(71) Applicant: Benjamin M. Cromeens, Houston, TX (US)

(72) Inventor: Benjamin M. Cromeens, Houston, TX (US)

(73) Assignee: Benjamin M. Cromeens, Houston, TX (US)

( * ) Notice: Subject to any disclaimer, the term of this patent is extended or adjusted under 35 U.S.C. 154(b) by 885 days.

(21) Appl. No.: 14/674,655

(22) Filed: Mar. 31, 2015

(65) Prior Publication Data
US 2016/0288422 A1  Oct. 6, 2016

(51) Int. Cl.
*B29C 67/00* (2017.01)
*G05B 19/4099* (2006.01)
*B29C 64/386* (2017.01)
*B33Y 50/02* (2015.01)
*B33Y 80/00* (2015.01)

(52) U.S. Cl.
CPC ............. *B29C 64/386* (2017.08); *B33Y 50/02* (2014.12); *B33Y 80/00* (2014.12)

(58) Field of Classification Search
CPC ........ B29C 64/386; B33Y 50/02; B33Y 80/00
See application file for complete search history.

(56) References Cited

U.S. PATENT DOCUMENTS

| | | | | |
|---|---|---|---|---|
| 4,976,737 A * | 12/1990 | Leake | ................... | A61F 2/0059 128/898 |
| 7,050,877 B2 * | 5/2006 | Iseki | ..................... | A61F 2/2875 623/17.19 |
| 9,141,731 B2 * | 9/2015 | Mattson | .................. | G06F 17/50 |
| 2004/0138591 A1 * | 7/2004 | Iseki | ..................... | A61F 2/2875 600/587 |
| 2010/0214290 A1 * | 8/2010 | Shiell | ..................... | G06K 9/621 345/420 |
| 2011/0016690 A1 * | 1/2011 | Narainasamy | ...... | A61F 2/30942 29/428 |
| 2013/0346029 A1 * | 12/2013 | Mattson | .................. | G06F 17/50 703/1 |
| 2015/0009209 A1 * | 1/2015 | Shin | ....................... | G06T 17/00 345/419 |

* cited by examiner

*Primary Examiner* — Abdelmoniem I Elamin
(74) *Attorney, Agent, or Firm* — Fiala & Weaver P.L.L.C.

(57) ABSTRACT

Methods, systems, and apparatuses are described for biological model symmetry. Model data relating to a biological specimen may be generated and/or stored in a memory of a computing system. The model data may be generated using a 3D scanner, or the like, of the biological specimen. The computing system may receive an indication of a selection from a user interface specifying a first portion of the model data that was selected. A mirrored representation of the first portion may be generated by the computing system using a processor(s). A second portion of the model data that is different from the first portion may be replaced with the mirrored representation to generate symmetric biological model data. The symmetric biological model data may then be used to generate a physical symmetric model of the biological specimen. The physical model may be generated using a 3D printer, a 3D router, or the like.

20 Claims, 8 Drawing Sheets

METHOD, SYSTEM, AND APPARATUS FOR BIOLOGICAL MODEL SYMMETRY

BACKGROUND

I. Technical Field

Embodiments described herein relate to generating biological models having symmetry.

II. Background Art

Quality and beauty of products within the taxidermy industry, such as mounts, are often measured by criteria such as symmetry. Manufacturers in the taxidermy industry attempt to attain as perfect symmetry as possible in their products using hand-held measurement tools, such as calipers. Most vertebrate specimens display a loose bi-lateral symmetry phenotype. However, vertebrate specimens usually have flaws and/or asymmetrical characteristics, e.g., in bone or body structure, which are viewed as imperfections in final products such as mounts.

BRIEF SUMMARY

Methods, systems, and apparatuses are described for generating biological models having symmetry, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "back," etc.) used herein are for purposes of illustration only, and that practical implementations of the structures described herein can be spatially arranged in any orientation or manner.

Still further, it should be noted that the drawings/figures are not drawn to scale unless otherwise noted herein.

As used herein, the term "biological specimen" means an animal, or a portion thereof, that is/was alive.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner and are not mutually exclusive.

II. Example Embodiments

The example techniques and embodiments described herein may be adapted to various types of manufacturing devices and systems, computing systems, electronic and/or processing devices, and/or the like, to create symmetric biological models. The example techniques and embodiments described herein may be adapted to various types of biological specimens for symmetric model creation. For example, biological specimens, such as vertebrate specimens, may be used in the taxidermy industry to create representations or replications thereof, referred to as mounts. Trophy animals and "big game" animals are often processed using taxidermy methods for hunters and/or collectors. Such animals may include, without limitation, small or large cats, small or large hoofed animals such as types of deer, moose, elk, gazelle, etc., giraffes, elephants, wild hogs, canines, and/or the like. For instance hides, horns or antlers, skulls and other parts of the skeletal structure, etc., of vertebrate specimens are typically used for producing such representations or replications (i.e., mounts). Other types of animals such as fish, marine mammals, birds/fowl, reptiles, etc., even pets, may also be preserved as representations or replications via methods of taxidermy. Similarly, museums, zoos, and/or the like may include representations or replications of biological specimens in exhibits. In embodiments described herein, biological specimens may be characterized as non-human biological specimens. Non-vertebrate biological specimens with exoskeletons are also contemplated herein.

A challenge in the taxidermy industry continues to be flaws and/or asymmetrical characteristics, e.g., in bone or body structure, in existing biological specimens which detract from the quality and/or beauty of representations or replications of such biological specimens. Thus there exists an unmet need for techniques by which symmetry may be achieved for representations or replications of biological specimens. The inventive techniques and embodiments described herein provide for altering and generating data models from which symmetric physical models of biological specimens may be created. Although specific, individual specimens may be symmetrically flawed, repairs of such flaws for these specimens may be conducted using the described techniques and embodiments. For instance, using symmetric physical models, according to the described techniques and embodiments as a basis for creation of representations or replications of biological specimens, symmetric representations or replications of biological specimens may be achieved.

In embodiments, a system or device (e.g., a computing system and/or a computing device such as described below with respect to FIGS. 1 and 13 respectively) may be used in the creation of symmetric models of biological specimens. In one embodiment, model data relating to a biological specimen may be generated and/or stored in a memory of a computing device/system. The model data may be initially generated using a three-dimensional (3D) scanner, or the like, to obtain a scan of the biological specimen. The computing device/system may receive an indication of a selection from a user interface specifying a first portion of the model data that was selected. A mirrored representation of the first portion may be generated by the computing device/system using one or more processors. A second portion of the model data that is different from the first portion may be replaced with the mirrored representation to generate symmetric biological model data. The symmetric biological model data may then be used to generate a physical symmetric model of the biological specimen. The physical symmetric model may be generated using a 3D printer, a 3D router, or the like. Furthermore, additional structural and operational embodiments, including modifications and/or alterations, will become apparent to persons skilled in the relevant art(s) from the teachings herein.

In embodiments, biological models may be based on a portion of an actual biological specimen, or on a model or a mold of an actual biological specimen. Such models and/or molds may inherit flaws and/or asymmetric characteristics from the portion of the biological specimen.

The techniques and embodiments described herein provide for such improvements in biological model symmetry as described above.

For instance, methods, systems, and apparatuses are provided for generating biological model symmetry. In an example aspect, a physical symmetric biological model is disclosed. The physical symmetric biological model includes a first model portion and a second model portion. The first model portion is based on a first portion of a biological specimen, where the first portion of the biological specimen comprises at least one feature with a preferred characteristic compared to a corresponding second portion of the biological specimen. The preferred characteristic is determined based on an analysis of the biological specimen using a computer model of the biological specimen. The second model portion is based on the first model portion. The second model portion is to replace the corresponding second portion of the biological specimen for the model, and is a mirrored representation of the first model portion.

In another example aspect, a method for generating symmetry in biological models is disclosed. The method includes receiving model data relating to a biological specimen, and receiving an indication of a selection specifying a first portion of the model data using a computing device. The method also includes generating a mirrored representation of the first portion, and replacing a second portion of the model data that is different from the first portion with the mirrored representation to generate a symmetric biological model data using the computing device.

In yet another example aspect, a computer-readable storage medium is provided. The computer-readable storage medium has program instructions recorded thereon that, when executed by a processing device, perform a method for generating symmetry in biological models. The method includes receiving model data relating to a biological specimen, and receiving an indication of a selection specifying a first portion of the model data. The method also includes generating a mirrored representation of the first portion, and replacing a second portion of the model data that is different from the first portion with the mirrored representation to generate a symmetric biological model data.

It is contemplated that different embodiments described herein may be implemented together in various combinations, as would be apparent to one of skill in the art having the benefit of this disclosure. That is, embodiments described herein are not mutually exclusive of each other and may be practiced alone, or in any combination.

Various example embodiments are described in the following subsections. In particular, example device and system embodiments are described, followed by example model embodiments. Example operational embodiments are then described. Subsequently, an example computer implementation is described. Next, further example embodiments and advantages are provided. Finally, some concluding remarks are provided. It is noted that the division of the following description generally into subsections is provided for ease of illustration, and it is to be understood that any type of embodiment may be described in any subsection.

III. Example Device and System Embodiments

Systems and devices may be configured in various ways to generate symmetric biological models. Techniques and embodiments are provided for implementing devices and systems to generate symmetric biological models. For instance, in embodiments, a processing device or system may be programmed and/or utilized to perform a method to generate a symmetric biological model(s). Likewise, fabrication and/or manufacturing devices and systems may be programmed and/or utilized to perform a method to generate a symmetric biological model(s).

Figure 1:
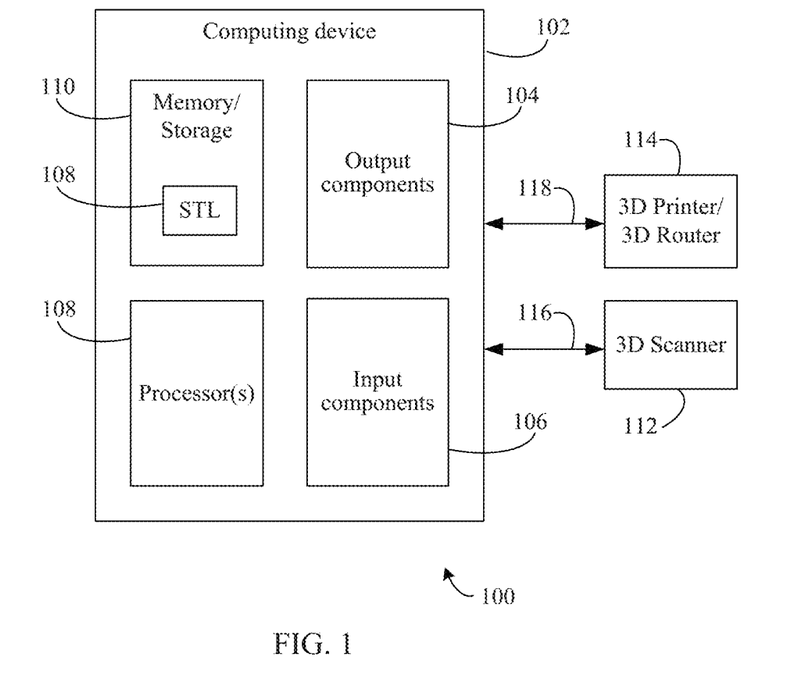
FIG. 1 shows a block diagram of a symmetric biological model system, according to example embodiments.

FIG. 1 shows an example symmetric biological model system 100 (system 100) for implementing the above-referenced improvements and techniques. System 100 may include a computing device 102, a 3D scanner 112, and a 3D printer/3D router 114, according to embodiments. Computing device 102 may include one or more output components 104, one or more input components 106, one or more processors 108, and memory/storage 110.

In embodiments, processor(s) 108 may be one or more processing devices or processor circuits such as processor 1306 of FIG. 13 described below. Processor(s) 108 may be a processor(s) configured to execute one or more parts of techniques and methods described herein.

Memory/storage 110 may include one or more memory and/or storage components, e.g., such as those described below, e.g., with respect to FIG. 13, according to embodiments (e.g., memory or storage devices). For instance, memory/storage 110 may include data or program storage of a processor or processing device, volatile or non-volatile memory, including types of random access memory (RAM) and/or read-only memory (ROM), disk storage devices, solid state storage devices, etc. Memory/storage 110 may be configured to store one or more biological models and one or more generated symmetric biological models, including any associated model data. In embodiments, the one or more biological models and/or model data may be received from 3D scanner 112 and stored in memory/storage 110, or the like, and the one or more generated symmetric biological models may be created using processor(s) 108 and stored in memory/storage 110. In embodiments, the one or more generated symmetric biological models may be provided to 3D printer/3D router 114, or the like, from memory/storage 110. The model data (as well as symmetric biological model data described herein) associated with biological models and symmetric biological models may be generated in a stereo lithography (STL) format 118, or another format as would be understood by a person of skill in the relevant art(s) having the benefit of this disclosure, and stored in memory/storage 110.

In embodiments, output components 104 may include display components such as monitors or screens to be viewed by a user, and may include one or more data communication interfaces for transmitting data over a network(s) or to other components of system 100 and/or computing device 102. The display components may be any known display interface as would be understood by a person of skill in the relevant art(s) having the benefit of this disclosure. In embodiments, a display interface may combined with an input component of input components 106 in a single, multi-purpose input-output interface, such as a touchscreen.

In embodiments, input components 106 may include a user-manipulatable component(s), one or more microphones, a data interface(s), and one or more data communication interfaces. User-manipulatable components may include a mouse, a keyboard, keypad, touchscreen, stylus pad, etc., that a user may manipulate to provide an input and/or input command. Microphones may be any known microphone as would understood by a person of skill in the relevant art(s) having the benefit of this disclosure, and may be configured to receive sounds generated by a user (e.g., voice commands for programs executing on processor(s) 108). For example, one or more of these microphones may comprise an acoustic-to-electric transducer that operates in a well-known manner to convert sound waves into an electrical signal. Data interfaces may be configured to allow a user to provide computing device 102 and/or system 100 with electronic models and model data. Data communication interfaces may be configured for receiving data from a network(s) or from other components of system 100 and/or computing device 102.

Computing device 102 may comprise a computer, mobile or stationary, such as and without limitation, a laptop computer, a tablet computer, a desktop computer, a server computer, a computer terminal, and/or the like. In embodiments, as described in further detail below, one or more portions of computing device 102 and/or system 100 may be implemented as a system. For instance, in some embodiments, one or more components that are shown as being an integrated part of computing device 102 may be part of an external device or system (not shown) that is connected to computing device 102. In such embodiments, system 100 may thus comprise an example system.

As noted above, system 100 may also include 3D scanner 112 and 3D printer/3D router 114. It should be noted, however, that equivalent components are contemplated in system 100, and the described, example embodiments should not be construed as limiting.

3D scanner 112 may be configured to scan a biological specimen or a model representation thereof to generate 3D model data or model data. As used herein, model data may refer to 3D model data. For example, a skeletal portion of a biological specimen, a sculpted or form mold representation thereof, and/or the like, may be scanned to generate model data. The model data (as well as symmetric biological model data described herein) may be generated in a stereo lithography (STL) format or the like. The model data generated by 3D scanner 112 may be stored in a memory or storage device as described herein, e.g., such as memory/storage 110 of computing device 102. In embodiments, model data generated by 3D scanner 112 may be provided to computing device on a portable memory or storage device, from a remote storage location, or over a communication path 116. In embodiments, 3D model data or model data may be generated using radiography techniques, magnetic resonance imaging (MRI), nuclear MRI, computerized tomography (CT) scan technologies, and/or the like.

3D printer/3D router 114 may be configured to generate or create a symmetric biological model as described herein, such as physical symmetric biological models. In embodiments, symmetric biological models may be created by 3D printer/3D router 114 based on symmetric model data stored in a memory or storage, e.g., memory/storage 110 as described above, that may in turn be based on model data generated by 3D scanner 112 processed according to the described embodiments to generate symmetric biological model data. 3D printer/3D router 114 may be configured to generate or create a symmetric biological models using known materials for such devices, including without limitation, foams, plastics, woods, metals, composites, silicone and silicone materials, urethane materials, and or the like, including known 3D printing materials.

In embodiments, either or both of 3D scanner 112 and 3D printer/3D router 114 may include one or more subcomponents of computing device 102. In such embodiments, functions and operations of computing device 102, and any of its subcomponents, related to the techniques described herein may be performed in whole or in part on either or both of 3D scanner 112 and 3D printer/3D router 114.

In embodiments, computing device 102 and/or system 100 may comprise wired and/or wireless communication circuitry and/or connections (not shown) to enable data communications between electronic device 102 and/or system 100 and other devices, systems, and/or networks, such as, but not limited to, manufacturing equipment and devices, computer networks, telecommunication networks, other electronic devices, the Internet, and/or the like.

While various components of system 100 and computing device 102 are described above, such example components are not contemplated as being exhaustive or limiting, and other components, as well as variations and alternate/equivalent components, are contemplated in embodiments.

IV. Example Model Embodiments

Various techniques for generating symmetric biological models using, e.g., system 100 and/or computing device 102 of FIG. 1 described above, are contemplated herein. The various techniques and embodiments provided for implementing devices and systems to generate symmetric biological models may be performed or carried out in different ways. For instance, in embodiments, a processing device or system may be programmed and/or utilized to perform a method to generate a symmetric biological model(s). Likewise, fabrication and/or manufacturing devices and systems may be programmed and/or utilized to perform a method to generate a symmetric biological model(s) as described in this section.

Figure 2:
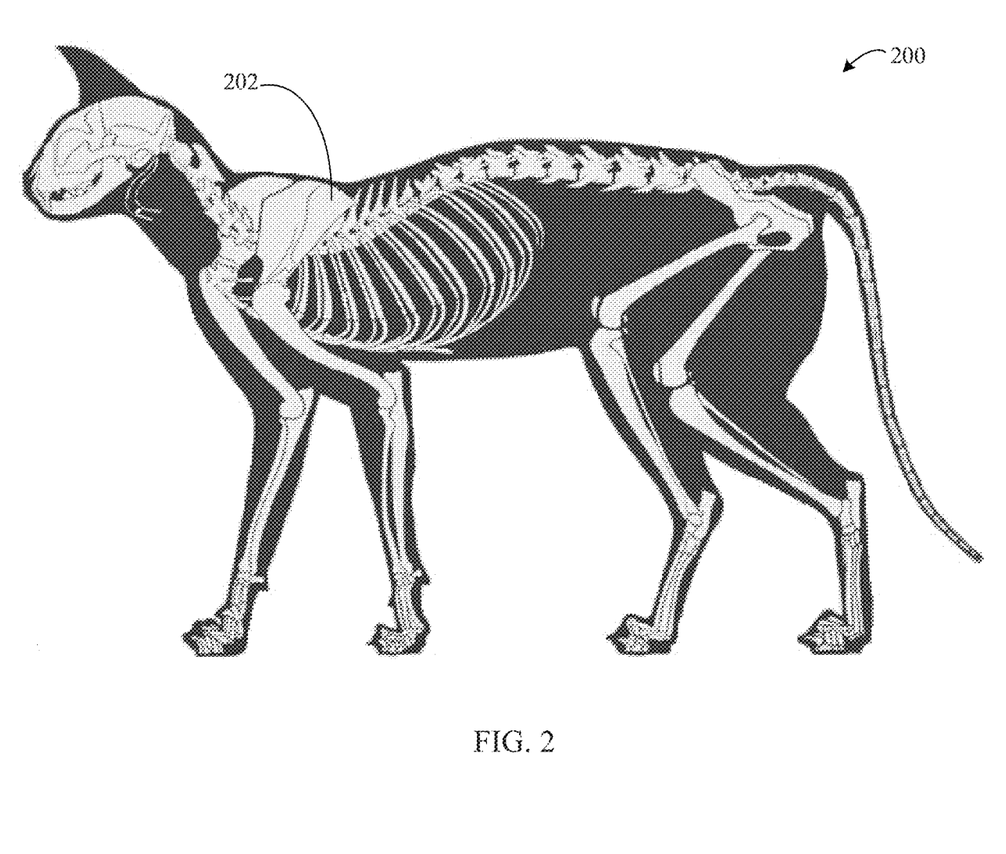
FIG. 2 shows a diagram of an exemplary biological specimen that illustrates an internal bone structure of the biological specimen.

Turning now to FIG. 2, an exemplary biological specimen 200 is shown. While biological specimen 200 is illustrated as a member of the cat family (felidae), other biological specimens (e.g., of any animal families) are contemplated herein, e.g., animals belonging to phylum chordata. In embodiments, biological specimens may be vertebrates, and symmetric biological models may be based on the skeletal structure and/or muscular structure thereof.

Vertebrate biological specimens are generally naturally bi-lateral in their skeletal structure, but do not typically exhibit true perfect, bi-lateral symmetry. For instance, a left and a right side of a skull of a vertebrate biological specimen may differ (e.g., either naturally or due to interaction with environmental factors of the biological specimen) in size, shape, texture, features, or other characteristics. Similarly, flaws in a biological specimen may be attributed to one or more of injuries, defects such as birth defects, malnutrition, behaviors of the biological specimen during its lifetime, etc., and may contribute to asymmetrical characteristics of its skeletal structure or parts thereof, and may also detract from beauty of the biological specimen. For instance, a left limb that was broken or injured during the lifetime of a biological specimen may be asymmetric with respect to the corresponding right limb.

As shown, biological specimen 200 includes a skeletal portion 202 comprising one or more skeletal components. Skeletal portions can include any bone or component, or set of related bones, of a skeletal system of a biological specimen, such as but without limitation, one or more of a skull, a jaw bone, a spine or portions thereof, bones of limbs, rib bones, tail bones, bones of feet, hooves, hands, and/or the like, etc.

A model, such as the symmetric biological models described herein, may be based on one or more portions of a biological specimen. For instance, in some embodiments, symmetric biological models may be based directly on an actual biological specimen or a portion(s) thereof. As an example, a symmetric biological model may be based on, and/or created from, a skull of a biological specimen. In other embodiments, symmetric biological models may be based indirectly on an actual biological specimen or a portion(s) thereof through the use of an initial model or sculpted representation (or the like) of the actual biological specimen or a portion(s) thereof. It should be noted that in such cases, the initial model or sculpted representation (or the like) will inherit one or more asymmetric characteristics of the actual biological specimen in its creation. Examples of such asymmetric characteristics are described above.

As described herein, a base model may be a model used during the described processing, analysis, and generation for symmetric biological models and/or physical symmetric biological models.

Figure 3:
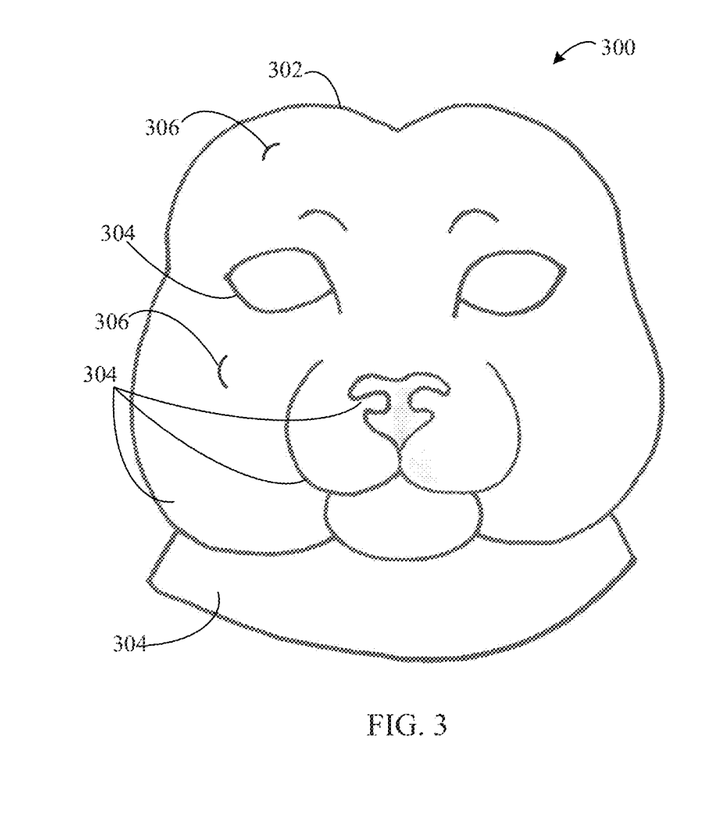
FIG. 3 shows a base model of a biological specimen, according to an example embodiment.

FIG. 3 depicts a base model 300 of a biological specimen. In embodiments, base model 300 may be a portion of a biological specimen, or may be an initial model based on a biological specimen. As noted above, biological specimens and initial models based on biological specimens include asymmetrical aspects with respect to the bi-lateral features of the biological specimens.

As shown, base model 300 includes a main portion 302. Main portion 302, as illustrated in this non-limiting example, is of a skull or head of a cat (although other main portions, such as different parts of a cat or portions of other biological specimens are contemplated). In embodiments, main portion 302 may be one of one or more portions from which a symmetric biological model is desired. Main portion 302 may include asymmetrical shape portions 304, and may include a flaw portion(s) 306. In embodiments, base model 300 and/or main portion 302 may include one or more of either or both of asymmetrical shape portions 304 and flaw portion(s) 306.

Asymmetrical shape portions 304 may include differences between associated bi-lateral portions (e.g., left and right (as shown), and may also refer to top and bottom, front and back, etc.) of base model 300 and/or main portion 302 such as size, shape, and/or the like, as described above. For illustrative and descriptive clarity in the described example embodiment, asymmetrical shape portions 304 are shown with respect to the right side (viewer's left) of main portion 302, but it is contemplated that the left side of main portion 302 may also include asymmetrical shape portions 304 in embodiments. Asymmetrical shape portions 304 are shown in further detail in FIG. 6 described below.

Flaw portions 306 may also create asymmetry between bi-lateral portions of base model 300 and/or main portion 302. In embodiments, flaw portions 306 may be one or more flaws described herein. As illustrated, flaw portions 306 are shown with respect to the right side (viewer's left) of main portion 302, but it is contemplated that the left side of main portion 302 may also include flaw portions 306 in embodiments.

As illustrated, asymmetrical shape portions 304 and flaw portions 306 included in the right side of base model 300 and main portion 302 create asymmetry between the left and right sides of the model, and also detract from the beauty of the model.

Base model 300 may be scanned using a 3D scanner (e.g., 3D scanner 112 of FIG. 1) or the like to generate model data representative of base model 300. Such model data may be provided to a computing device for storage in a memory/storage thereof (e.g., memory/storage 110 of computing device 102 of FIG. 1.

Figure 4:
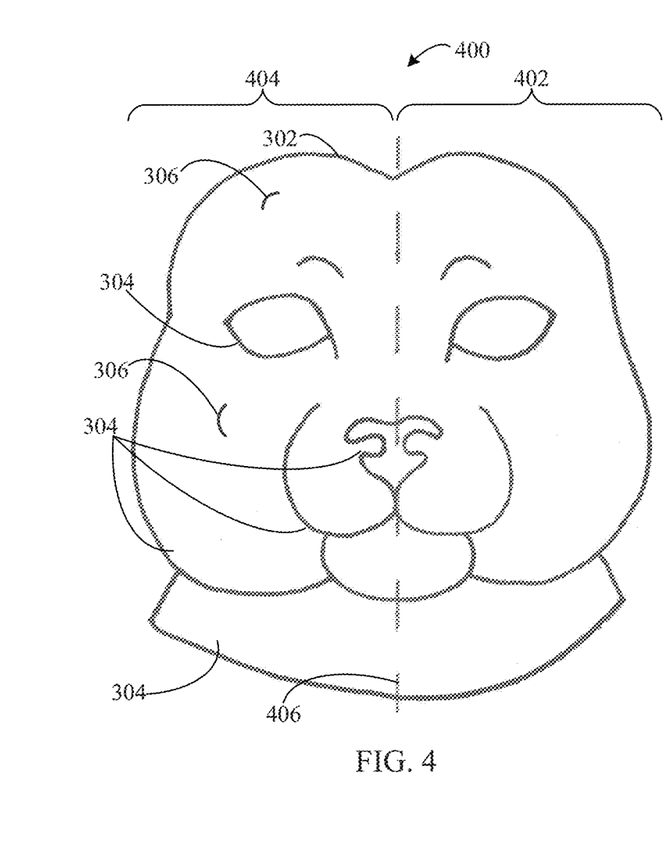
FIG. 4 shows the base model of the biological specimen of FIG. 3, with a bi-lateral symmetry line defining first and second portions, according to an example embodiment.

FIG. 4 depicts a base model 400 of a biological specimen that may be a further embodiment of base model 300 of FIG. 3. In embodiments, base model 400 may depict base model 300 during analysis of the base model and/or generation of a symmetric biological model. Base model 400 may be a representation of base model 300 embodied as model data generated by a 3D scanner or the like, as described above. Model data, for example, in the model data embodiment of base model 400, may include representations of asymmetrical shape portions 304 and/or representations of flaw portions 306 which may be inherited from base model 300 during a scan by a 3D scanner.

Base model 400 will now be described in the context of base model 400 as a data model representation of base model 300. Base model 400 may include a first portion 402 (corresponding to the left side of the model) and a second portion 404 (corresponding to the right side of the model). As shown, first portion 402 and second portion 404 each represent a bi-lateral half of base model 400 around a bi-lateral symmetry line 406.

An analysis of base model 400 (and/or base model 300) may be performed by a computer program and/or by a user (e.g., a taxidermist) using such a program. During such an analysis, bi-lateral portions (e.g., first portion 402 and second portion 404) of one or both base models 400/300 may be reviewed for beauty and symmetry, and in embodiments other desired characteristics of a biological specimen, both within the respective portions themselves and within the model as a whole may be analyzed. In embodiments, a user may review base model 400 as a set of model data using a computing device as described herein, and analyze the physical characteristics of the model. Likewise, a computer program may perform an analysis on the model data, according to embodiments, based on set parameters, or ranges thereof, indicative of beauty and/or symmetry. Furthermore, a user may supplement their review and analysis of the model data using the computer program.

In the illustrated example of FIG. 4, a user and/or computer program may determine that first portion 402 is more desirable than second portion 404. This determination may be based on characteristics of the portions including, but not limited to, beauty and symmetry. Such determinations may be based on data points of the model data and their variance with respect to symmetry and/or deviation from a normal value, as well as a number of flaws, according to embodiments. For instance, first portion 402 contains fewer flaw portions 306 than second portion 404. Additionally, second portion 404 contains asymmetrical characteristics with respect to first portion 402, and it may be determined that first portion 402 contains more symmetry and/or beauty and is therefore desired over second portion 404.

The user may select first portion 402, e.g., by selecting first portion 402 using the computer program, as the desired portion to keep in base mode 400. Alternatively, in embodiments, the user may select second portion 404 as the undesired portion to remove or delete from base model 400. The selected portion may be denoted by selection with respect to bi-lateral symmetry line 406, by using an input command of a mouse, stylus, and/or the like to select the portion, by voice command, or by any other selection command input as would understood by a person of skill in the relevant art(s). In some embodiments, the computer program may automatically select the desired or undesired portion based on data points of the model as described above. It should be noted that in some embodiments, e.g., with respect to bi-lateral symmetry, specifically selecting a first portion or a first half of a model to keep or to remove effectively also selects the second portion or second half to be removed or kept, respectively. As used herein, selecting a first portion (e.g., by use of input commands), whether to keep or to remove from a model, also means selecting a second portion to remove or to keep, respectively. Accordingly, receiving an indication of a selection specifying a first portion of the model data to keep includes an effective selection specifying a second portion to remove or delete. Likewise, receiving an indication of a selection specifying a first portion of the model data to remove or delete includes an effective selection specifying a second portion to keep.

Figure 5:
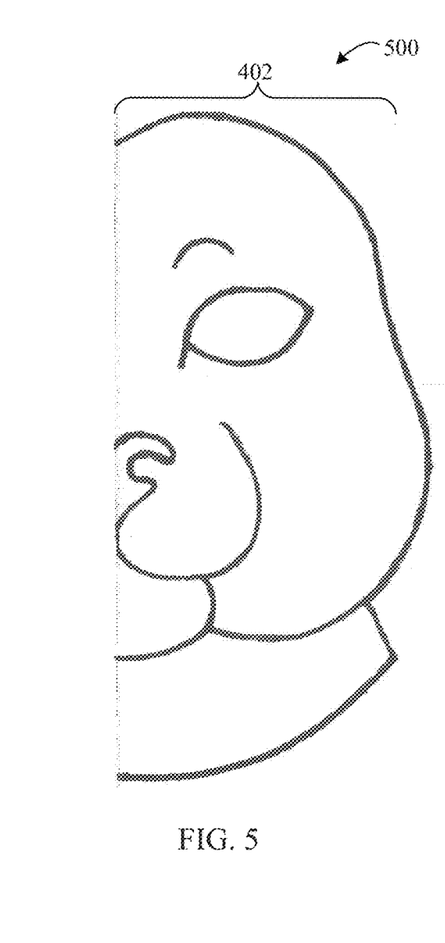
FIG. 5 shows the first portion of the base model of the biological specimen of FIG. 4, according to an example embodiment.

Turning now to FIG. 5, a base model portion 500 is shown. In embodiments, base model portion 500 is a representation of first portion 402 of base model 400. As illustrated, base model portion 500 does not include second portion 404 of base model 400. According to embodiments, the undesired portion of a base model (e.g., second portion 404 from base model 400 of FIG. 4) may be removed from the model data either by selecting and keeping the desired portion (e.g., first portion 402 from base model 400 of FIGS. 4 and 5), or by selecting and removing the undesired portion. The remaining, desired portion may thus represent part of a desired symmetric biological model, as described herein.

In embodiments, the model data associated with the desired portion (e.g., first portion 402 from base model 400 of FIGS. 4 and 5) may be stored in a storage or memory as described herein as the model data for base model portion 500.

Figure 6:
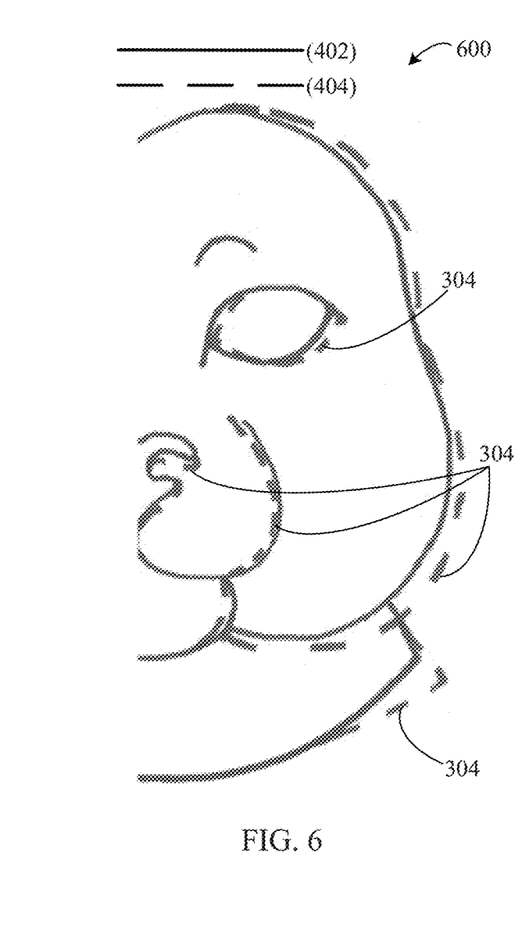
FIG. 6 shows an overlay of the first portion with the second portion of the base model of FIG. 4, according to an example embodiment.

FIG. 6 depicts an overlay 600 of first portion 402 with second portion 404 of base model 400 of FIG. 4. First portion 402 is shown as a solid outline, and second portion 404 is shown as a dashed outline. Asymmetrical shape portions 304 associated with second portion 404 are shown for illustration in overlay 600. As can be seen by a comparison between first portion 402 and second portion 404 in base model 400 of FIG. 4 versus overlay 600, asymmetric features in base model 400 may be present although more difficult to discern. However, overlay 600 illustrates the asymmetry between first portion 402 and second portion 404 that may be corrected using the techniques and embodiments herein.

Figure 7:
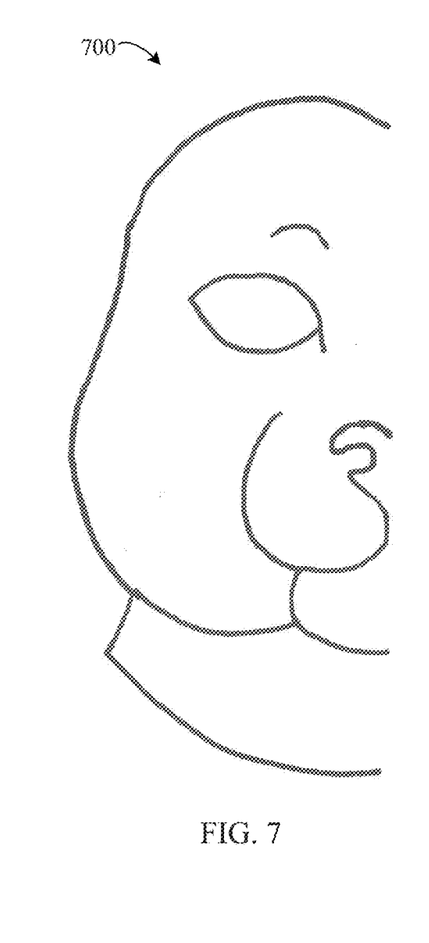
FIG. 7 shows a symmetric base model portion, according to an example embodiment.

FIG. 7 depicts a symmetric base model portion 700. Symmetric base model portion 700 may be a model data representation of base model portion 500 of FIG. 5 that has been replicated and mirrored to form a symmetric bi-lateral counterpart to base model portion 500 of FIG. 5. In embodiments, commands may be entered by a user causing a computer program running on a processing device (e.g., in a computing device 102 as in FIG. 1, and as in computer 1300 FIG. 13, described below) to replicate and mirror base model portion 500 of FIG. 5 (e.g., first portion 402) to generate symmetric base model portion 700.

In embodiments, the model data associated with symmetric base model portion 700 may be stored in a storage or memory as described herein, and may associated with, or stored separately from, base model portion 500.

Figure 8:
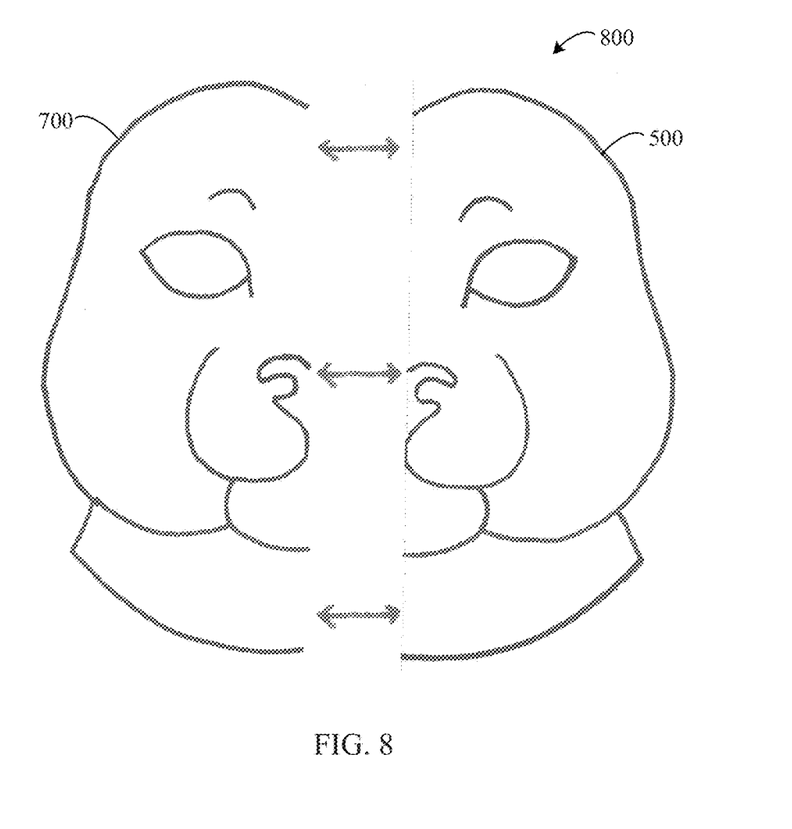
FIG. 8 shows a joining schematic of the base model first portion of FIG. 5 with the symmetric base model portion of FIG. 7, according to an example embodiment.

FIG. 8 depicts a joining schematic 800 of base model portion 500 of FIG. 5 with symmetric base model portion 700 of FIG. 7. FIG. 8 is intended to represent a three-dimensional joining of the three-dimensional base model portions 500 and 700 together to in the three-dimensional joining schematic 800. In embodiments, commands may be entered by a user causing a computer program running on a processing device (e.g., in a computing device 102 as in FIG. 1, and as in computer 1300 FIG. 13, described below) to join base model portion 500 (e.g., first portion 402 of FIGS. 4 and 5) with symmetric base model portion 700. For example, a user may use an input device, such as a described herein, to position base model portion 500 together symmetric base model portion 700 such that they form a single, whole model portion according to joining schematic 800. It is contemplated herein that one or more alterations or modifications of base model portion 500 and/or symmetric base model portion 700 may be made in order to provide a seamless joining of these components, e.g., due to inaccuracies of desired/undesired portion selections, characteristics of biological specimens, etc., according to embodiments.

Figure 9:
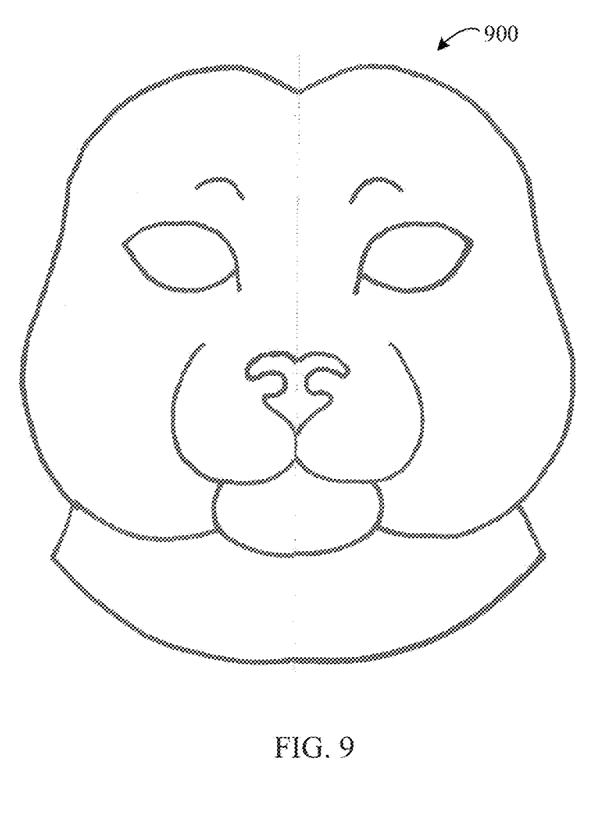
FIG. 9 shows a symmetric biological model, according to an example embodiment.

FIG. 9 depicts a symmetric biological model 900. Symmetric biological model 900 comprises a bi-lateral, symmetric model of a biological specimen. Symmetric biological model 900 may also comprise any type of symmetry according to the described embodiments (e.g., left and right (as shown), top and bottom, front and back, etc.). Symmetric biological model 900 may represent either symmetric biological model data or a physical symmetric biological model in embodiments. For instance, the resulting model data generated according to joining schematic 800 may be model data of symmetric biological model 900, in embodiments. In other embodiments, symmetric biological model 900 may represent a physical symmetric biological model of a biological specimen. For example, model data associated with symmetric biological model 900 may be provided to a 3D printer or 3D router (e.g., 3D printer/3D router 114 of FIG. 1) to generate a physical symmetric biological model, e.g., using materials as described herein.

IV. Example Operational Embodiments

Embodiments and techniques, including methods, described herein may be performed in various ways such as, but not limited to, being implemented by hardware, software, firmware, and/or any combination thereof. Symmetric biological model system 100 of FIG. 1, along with any subcomponents thereof, as well as processor and computer embodiments described below, may each operate according to one or more of the flowcharts described in this section. Additionally, model data and physical models associated with biological specimens as described herein (e.g., base model 300 of FIG. 3, base model 400 of FIG. 4, base model portion 500 of FIG. 5, symmetric base model portion 700 of FIG. 7, and/or symmetric biological model 900 of FIG. 9), and any subcomponents thereof, may be created and/or generated according to one or more of the flowcharts described in this section. Other structural and operational embodiments will be apparent to persons skilled in the relevant art(s) based on the discussion regarding the described flowcharts.

Figure 10:
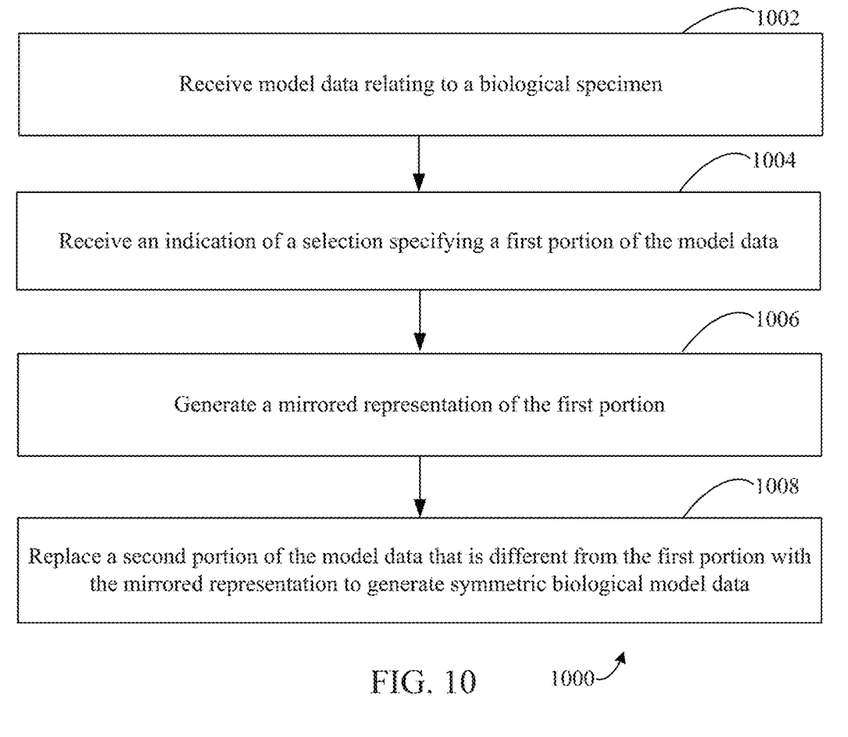
FIG. 10 shows a flowchart according to which example embodiments herein are configured to generate symmetric biological models and physical symmetric biological models, according to an example embodiment.

For example, FIG. 10 shows a flowchart 1000 according to which example embodiments herein are configured to perform. For instance, symmetric biological model system 100 of FIG. 1, along with any subcomponents thereof, may be configured to generate symmetric biological models and model data, according to flowchart 1000. Flowchart 1000 is described as follows.

In flowchart 1000, model data relating to a biological specimen is received (1002). In embodiments, the model data may be retrieved from a file stored in a memory or storage such as memory/storage 110 of FIG. 1. The model data may be generated by and/or received from a 3D scanner such as 3D scanner 112 of FIG. 1. In embodiments, model data from a 3D printer or 3D router may be stored in a memory or storage on receipt. The model data may be processed by a processing device and presented to a user via display devices and/or output components as described herein. Model data associated with base model 400 of FIG. 4 may be a model data representation of base model 300 of FIG. 3 subsequent to scanning by a 3D scanner.

An indication of a selection specifying a first portion of the model data may be received (1004). For example, a user may select a first portion of the model data using input devices and/or input commands as described herein. An indication of a selection may indicate that a left or right side of a model associated with the model data has been selected by a user to keep or to delete, in embodiments. The selection may be based on criteria such as symmetry and beauty. As noted herein, a selection may be made by a computer program or by a user using a computer program to view and analyze the model data. For example, with respect to base model 400 of FIG. 4, first portion 402 may be selected. In embodiments, a selection may indicate that one portion is to be kept and another portion is to be deleted or removed from the model. For instance, first portion 402 may be selected to keep, and is shown as model portion 500 of FIG. 5.

A mirrored representation of the first portion may be generated (1006). For example, in the case where a first portion of model data is selected to keep, this portion of the model data may be copied and mirrored using a computer program to generate the mirrored representation of the first portion. A mirrored representation shown as symmetric base model portion 700 of FIG. 7 may be created from base model portion 500 of FIG. 5 by replication and mirroring.

A second portion of the model data that is different from the first portion may be replaced with the mirrored representation to generate symmetric biological model data (1008). For instance, with respect to base model 400 of FIG. 4, a second portion 404 may be deleted or removed from a model and replaced with symmetric base model portion 700 of FIG. 7 to generate symmetric biological model data as illustrated in FIG. 9.

In some example embodiments, one or more of 1002, 1004, 1006, and/or 1008 of flowchart 1000 may not be performed. Moreover, capabilities in addition to or in lieu of 1002, 1004, 1006, and/or 1008 may be performed. Further, in some example embodiments, one or more of the capabilities in 1002, 1004, 1006, and/or 1008 may be performed out of order, in an alternate sequence, or partially (or completely) concurrently with each other or with other capabilities.

Figure 11:
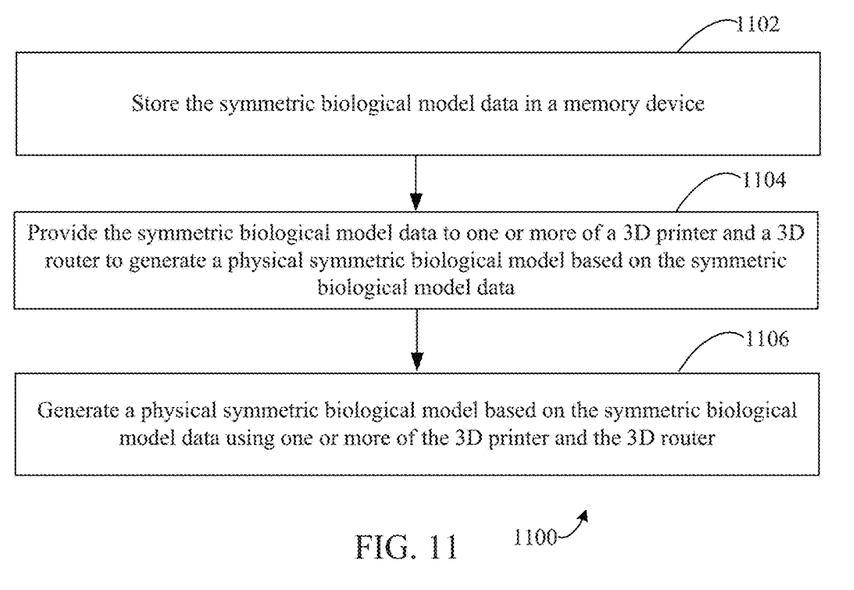
FIG. 11 shows a flowchart defining a process to generate symmetric biological models and physical symmetric biological models, according to an example embodiment.

FIG. 11 shows a flowchart 1100 according to which example embodiments herein are configured to perform. For instance, symmetric biological model system 100 of FIG. 1, along with any subcomponents thereof, may be configured to generate symmetric biological models and model data, according to flowchart 1100. Flowchart 1100 may represent a further embodiment of flowchart 1000 in FIG. 10 (e.g., flowchart 1100 may include its elements in addition to one or more elements of flowchart 1000, in embodiments). Flowchart 1100 is described as follows.

In flowchart 1100, the symmetric biological model data may be stored in a memory device (1102). In embodiments, the symmetric biological model data may be stored in a memory or storage such as memory/storage 110 of computing device 102 of FIG. 1 subsequent to its generation. In some embodiments, the symmetric biological model data may be stored in a memory of a central server computer and/or the like, in a removable memory device, and/or in other storage such as cloud-based storage. In embodiments, the symmetric biological model data may be stored in a stereo lithography (STL) format.

The symmetric biological model data may be provided to one or more of a 3D printer and a 3D router to generate a physical symmetric biological model based on the symmetric biological model data (1104). For example, symmetric biological model data may be provided to 3D printer/3D router 114 of system 100 subsequent to its generation. In embodiments, symmetric biological model data may be provided to a 3D printer and/or 3D scanner from a memory or storage such as memory/storage 110 of computing device 102 of FIG. 1 as in 1102 above, although provisioning of symmetric biological model data from other memories or storages contemplated herein may occur in embodiments. A 3D printer and/or a 3D scanner may receive and process the symmetric biological model data, e.g., in an STL format, in order to generate a physical symmetric biological model, or a portion thereof, from one or more materials described herein.

A physical symmetric biological model may then be generated based on the symmetric biological model data using one or more of the 3D printer and the 3D router (1106). As described in 1104 above, a 3D printer and/or a 3D scanner may receive and process the symmetric biological model data, e.g., in an STL format, and the 3D printer and/or they 3D scanner may generate the physical symmetric biological model or portion thereof from one or more materials described herein.

In some example embodiments, one or more of 1102, 1104, and/or 1106 of flowchart 1100 may not be performed. Moreover, capabilities in addition to or in lieu of 1102, 1104, and/or 1106 may be performed. Further, in some example embodiments, one or more of the capabilities of 1102, 1104, and/or 1106 may be performed out of order, in an alternate sequence, or partially (or completely) concurrently with each other or with other capabilities.

Figure 12:
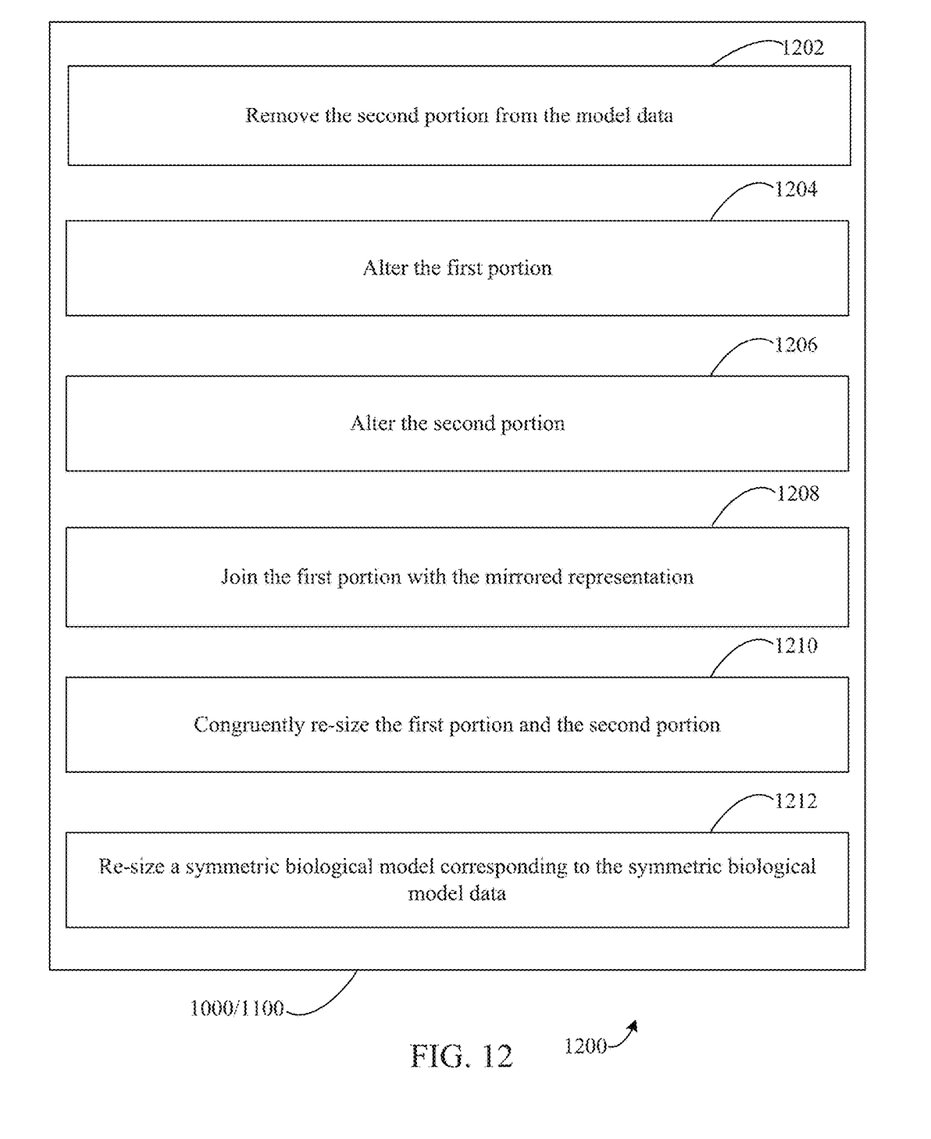
FIG. 12 shows a flowchart defining a process to generate symmetric biological models and physical symmetric biological models, according to an example embodiment.

FIG. 12 shows a flowchart 1200 according to which example embodiments herein are configured to perform. For instance, symmetric biological model system 100 of FIG. 1, along with any subcomponents thereof, may be configured to generate symmetric biological models and model data, according to flowchart 1200. Flowchart 1200 may represent a further embodiment of flowchart 1000 in FIG. 10 and/or flowchart 1100 of FIG. 11 (e.g., flowchart 1200 may include its elements in addition to one or more elements of flowchart 1000 and/or flowchart 1100, in embodiments). Flowchart 1200 is described as follows.

In flowchart 1200, the second portion may be removed from the model data (1202). For example, as noted above in 1004 of flowchart 1000, an indication of a selection specifying a first portion of the model data may be received. A user may select a first portion of the model data using input devices and/or input commands as described herein. An indication of a selection may indicate that a left or right side of a model associated with the model data has been selected by a user to keep or to delete, in embodiments. As described herein, a selection may be made by a computer program or by a user using a computer program to view and analyze the model data. For instance, with respect to base model 400 of FIG. 4, first portion 402 may be selected to keep. In embodiments, a selection may indicate that one portion is to be kept and another portion is to be deleted or removed from the model. In this example, selection of first portion 402 to keep effectively selects second portion 404 to delete or remove. The result of the removal of second portion 404 may be illustrated by base model portion 500 of FIG. 5. In embodiments, removal of a portion may be performed automatically by a program executing on a computer, or may require an input command from a user.

The first portion may be altered (1204). For example, a first portion of model data of a base model described herein may be altered during the generation of symmetric biological models. In embodiments, a portion of model data that is selected, or will be selected, as the portion to keep (e.g., as in 1004 of flowchart 1000) for example, based on symmetry, beauty, or other factors, may be altered to correct imperfections, flaws, and/or the like before or after processing is performed to generate a mirrored representation of the first portion. For instance, certain features of biological specimens may require that their corresponding model portions, when being joined (e.g., as described with respect to joining schematic 800 of FIG. 8, and as in 1208 below), be altered or modified at the intersection of the model portions to form a seamless and/or smooth seam or junction, or be modified for beauty, or for accuracy with respect to the biological specimen.

The second portion may be altered (1206). For example, a second portion of model data of a base model described herein may be altered during the generation of symmetric biological models. In embodiments, a portion of model data that is selected, or will be selected, as the portion to remove or delete for example, based on lesser symmetry, lesser beauty, or other factors, may be altered to correct imperfections, flaws, and/or the like before or after processing is performed to generate a mirrored representation of the first portion. In embodiments, a second portion of model data associated with a base model that corresponds to a mirrored representation of a first portion may be altered or modified after generation thereof for one or more reasons described above in 1204.

The first portion may be joined with the mirrored representation (1208). For instance, as described with respect to joining schematic 800 of FIG. 8, a first portion and its mirrored representation may be joined together in the formation of a symmetric biological model. As described herein, the joining may be performed by a computer program execution on a processing device and/or by a user of such a program. Alterations and modifications, e.g., as described in 1204 and 1206 above, may be performed in conjunction with, prior to, or subsequent to the joining for reasons of symmetry, beauty, accuracy, and/or the like.

The first portion and the second portion may be congruently re-sized (1210). Congruently re-sizing a first model portion and a second model portion may be performed either together or individually, using a computer and/or computer program as described herein. The re-sizing may be performed by altering model data associated with the model portions such that the size of the model portions is congruently changed. In embodiments, joined first and second model portions forming a symmetric biological model may be re-sized effectively re-sizing a symmetric biological model. Model portions may be re-sized to be larger or smaller in embodiments.

A symmetric biological model corresponding to the symmetric biological model data may be re-sized (1212). For example, a generated symmetric biological model, such as symmetric biological model 900 shown in FIG. 9, may be re-sized. The re-sizing may be performed by altering model data associated with the symmetric biological model such that the size of the symmetric biological model is changed. Models may be re-sized to be larger or smaller in embodiments.

In some example embodiments, one or more of 1202, 1204, 1206, 1208, 1210, and/or 1212 of flowchart 1200 may not be performed. Moreover, capabilities in addition to or in lieu of 1202, 1204, 1206, 1208, 1210, and/or 1212 may be performed. Further, in some example embodiments, one or more of the capabilities in 1202, 1204, 1206, 1208, 1210, and/or 1212 may be performed out of order, in an alternate sequence, or partially (or completely) concurrently with each other or with other capabilities.

V. Example Processor and Computer Implementations

Figure 13:
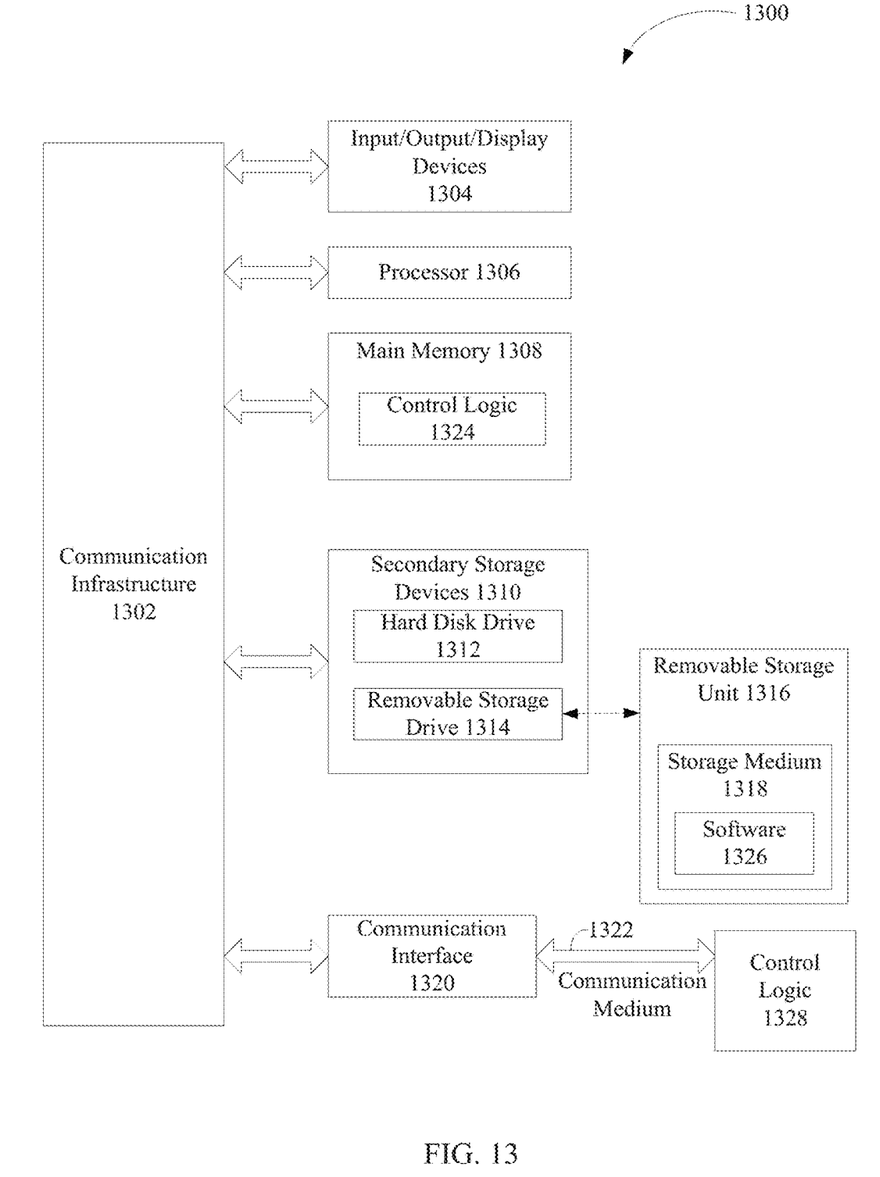
FIG. 13 shows a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 1300 shown in FIG. 13. It should be noted that computer 1300 may represent computing devices linked to product manufacturing machinery, processing devices, traditional computers, and/or the like in one or more embodiments. For example, computing device 100 of FIG. 1, and any of the sub-systems, components, and/or models respectively contained therein and/or associated therewith, may be implemented using one or more computers 1300.

Computer 1300 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1300 may be any type of computer, including a desktop computer, a server, etc.

Computer 1300 includes one or more processors (also called central processing units, or CPUs), such as a processor 1306. Processor 1306 is connected to a communication infrastructure 1302, such as a communication bus. In some embodiments, processor 1306 can simultaneously operate multiple computing threads, and in some embodiments, processor 1306 may comprise one or more processors.

Computer 1300 also includes a primary or main memory 1308, such as random access memory (RAM). Main memory 1308 has stored therein control logic 1324 (computer software), and data.

Computer 1300 also includes one or more secondary storage devices 1310.

Secondary storage devices 1310 include, for example, a hard disk drive 1312 and/or a removable storage device or drive 1314, as well as other types of storage devices, such as memory cards and memory sticks. For instance, computer 1300 may include an industry standard interface, such a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1326 (control logic) and/or data. Removable storage unit 1316 represents a floppy disk, magnetic tape, compact disk, DVD, optical storage disk, or any other computer data storage device. Removable storage drive 1314 reads from and/or writes to removable storage unit 1316 in a well-known manner.

Computer 1300 also includes input/output/display devices 1304, such as touchscreens, LED and LCD displays, monitors, keyboards, pointing devices, etc.

Computer 1300 further includes a communication or network interface 1320. Communication interface 1320 enables computer 1300 to communicate with remote devices. For example, communication interface 1320 allows computer 1300 to communicate over communication networks or mediums 1322 (representing a form of a computer useable or readable medium), such as LANs, WANs, the Internet, etc. Network interface 1320 may interface with remote sites or networks via wired or wireless connections.

Control logic 1328 may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers, 3D scanners, as well as manufacturing controllers and systems, such as but without limitation, 3D printers or 3D routers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 1306 of FIG. 13), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Further Example Embodiments and Advantages

Performance of the described embodiments for symmetric biological models provides for superior symmetry, quality, and beauty of products (e.g., mounts) in the taxidermy industry. The embodiments support model creation for different aspects of biological specimens, and allow for further modifications of generated symmetric biological models. The embodiments herein provide for creation of model data, e.g., using a computing device, and for creation of physical models.

Embodiments and techniques contemplate symmetric biological models for many different kinds of specimens, and also contemplate a variety of processes and materials for the creation of physical models.

Techniques and portions thereof described herein may be performed one or more times in generating symmetric biological models. For example, the left and right sides of a bi-lateral portion of a biological model may be analyzed for symmetry and/or beauty. It may be determined that the left side is preferred but that the left side also contains some asymmetrical shape portions and/or flaw portions not present in the right side of the model. According to embodiments, portions of the right side of the model may be selected, duplicated and mirrored, and used to replace portions of the left side prior to selecting, duplicating and mirroring the left side to replace the right side. In such embodiments, a portion of the right side that is less than half of the entire right side may be used.

Likewise, when selecting desired and undesired portions of models using model data, a desired or undesired portion may comprise more or less than half of a bi-lateral model, in embodiments. For instance, with respect to base model 400 of FIG. 4, less than all of second portion 404 may be removed and replaced by a corresponding part of first portion 402. Similarly, biological specimens having special features such as, but not limited to, undividable features such as horns, etc., either centered on or off-center from their bi-lateral symmetry line may be modeled according to the described embodiments to achieve symmetry outside of such special features, i.e., a symmetric biological model may be generated leaving out the special feature for symmetric model generation and adding it in after the symmetric model is generated.

In embodiments, symmetric biological models may be re-sized. For example, resizing models may include congruently re-sizing a first model portion and a second model portion, either together or individually, using a computer and/or computer program as described herein. In embodiments, joined first and second model portions forming a symmetric biological model may be re-sized effectively re-sizing symmetric biological model.

Furthermore, any number of physical symmetric biological models may be generated from a single set of symmetric biological model data in the same or in varying sizes and/or materials, as well as using one or more 3D printers/3D routers concurrently, at different locations, etc. Additionally, symmetric biological models and model data may be used in forming and molding techniques to generate negative reliefs in the creation of forms and/or molds that may be used to generate physical symmetric biological models.

The embodiments improve performance of computer systems by providing the ability to quickly and efficiently generate symmetric biological models based on an existing portion of a biological specimen or model thereof. Hence, less power and processing cycles are required to achieve a symmetric biological model using a computer processor, and manufacturing efficiency and costs are also improved using the described techniques. The ability of a processing device to generate symmetric biological models as described herein also improves the field of taxidermy and taxidermal mount creation by increasing the symmetry and beauty of physical biological models and the end mount products. Furthermore, the techniques and embodiments herein using a computer and/or processing device provide for improvements not only in operation of computers and systems associated with taxidermy practices, but also for improving the process of how biological models used in taxidermy are created.

As referred to herein, a physical biological model and/or physical symmetric biological model are articles of manufacture as defined under 35 U.S.C. § 101.

Embodiments and techniques described herein may be performed in various ways such as, but not limited to, being implemented by hardware, software, firmware, and/or any combination thereof. For example, embodiments may be implemented as specifically customized hardware or electrical circuitry that operates in a low-power mode.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A physical symmetric biological model for a mount that comprises:
    a first model portion of the physical symmetric biological model based on a first portion of a biological specimen, wherein the first portion of the biological specimen is made of a synthetic material and comprises at least one feature with a preferred characteristic compared to a corresponding second portion of the biological specimen, the preferred characteristic being determined based on an analysis of the biological specimen using a computer model of the biological specimen; and
    a second model portion of the physical symmetric biological model based on the first model portion, the second model portion being made of the synthetic material and replacing the corresponding second portion of the biological specimen for the model, and being a mirrored representation of the first model portion.

2. The physical symmetric biological model of claim 1, wherein the first model portion based on the first portion of the biological specimen is based on a vertebrate biological specimen.

3. The physical symmetric biological model of claim 2, wherein the first model portion comprises one or more skeletal component representations of the vertebrate biological specimen.

4. The physical symmetric biological model of claim 1, wherein the first portion of the biological specimen comprises a first half of a skull of the biological specimen.

5. The physical symmetric biological model of claim 1, wherein the first model portion and the second model portion are congruently re-sized.

6. A method for generating symmetry in physical biological models for mounts, the method comprising:
using a computing device:
receiving model data relating to a biological specimen;
receiving an indication of a selection specifying a first portion of the model data;
generating a mirrored representation of the first portion; and
replacing a second portion of the model data that is different from the first portion with the mirrored representation to generate symmetric biological model data; and
generating a physical symmetric biological model for a mount based on the symmetric biological model data.

7. The method of claim 6, wherein the model data relating to the biological specimen is received from a three-dimensional (3D) scanner that generated the model data; or
wherein the symmetric biological model data is generated in a stereo lithography (STL) format.

8. The method of claim 6, further comprising:
generating at least one of a form or a mold based on the symmetric biological model data.

9. The method of claim 6, further comprising one or more of:
storing the symmetric biological model data in a memory device; and
providing the symmetric biological model data to one or more of a 3D printer and a 3D router to generate the physical symmetric biological model based on the symmetric biological model data.

10. The method of claim 9, wherein said generating the physical symmetric biological model based on the symmetric biological model data comprises generating using one or more of the 3D printer and the 3D router.

11. The method of claim 6, wherein the biological specimen comprises one or more skeletal portions of a vertebrate biological specimen.

12. The method of claim 6, wherein replacing the second portion of the model data comprises one or more of:
removing the second portion from the model data;
altering the first portion;
altering the mirrored representation; and
joining the first portion with the mirrored representation.

13. The method of claim 6, further comprising at least one of:
congruently re-sizing the first portion and the second portion; or
re-sizing a symmetric biological model corresponding to the symmetric biological model data.

14. A non-transitory computer-readable storage medium having program instructions recorded thereon that, when executed by a processing device, perform a method for generating symmetry for physical biological models for mounts, the method comprising:
receiving model data relating to a biological specimen;
receiving an indication of a selection specifying a first portion of the model data;
generating a mirrored representation of the first portion as a new second portion of the model data;
replacing a second portion of the model data that is different from the first portion with the mirrored representation that is the new second portion to generate symmetric biological model data; and
congruently re-sizing the first portion and the new second portion that correspond to a physical symmetric biological model for a mount that is of a different size than the biological specimen.

15. The non-transitory computer-readable storage medium of claim 14, wherein the model data relating to the biological specimen is received from a three-dimensional (3D) scanner that generated the model data.

16. The non-transitory computer-readable storage medium of claim 14, wherein the symmetric biological model data is generated in a stereo lithography (STL) format.

17. The non-transitory computer-readable storage medium of claim 14, the method further comprising one or more of:
storing the symmetric biological model data in a memory device;
providing the symmetric biological model data to one or more of a 3D printer and a 3D router to generate a physical symmetric biological model based on the symmetric biological model data.

18. The non-transitory computer-readable storage medium of claim 14, wherein the biological specimen comprises one or more skeletal portions of a vertebrate biological specimen.

19. The non-transitory computer-readable storage medium of claim 14, wherein replacing the second portion of the model data comprises one or more of:
removing the second portion from the model data;
altering the first portion;
altering the mirrored representation; and
joining the first portion with the mirrored representation.

20. The non-transitory computer-readable storage medium of claim 14, the method further comprising re-sizing a symmetric biological model corresponding to the symmetric biological model data.

* * * * *